(12) United States Patent
Camilleri et al.

(10) Patent No.: US 10,933,348 B2
(45) Date of Patent: Mar. 2, 2021

(54) APPARATUS AND METHOD FOR SEPARATING PLANT TRICHOMES USING A DOUBLE VORTEX TURBULENCE

(71) Applicant: Delta Separations LLC, Cotati, CA (US)

(72) Inventors: Didier Camilleri, El Cerrito, CA (US); Benjamin K. Stephens, Santa Rosa, CA (US)

(73) Assignee: Delta Separations, LLC, Cotati, CA (US)

( * ) Notice: Subject to any disclaimer, the term of this patent is extended or adjusted under 35 U.S.C. 154(b) by 85 days.

(21) Appl. No.: 16/881,422

(22) Filed: May 22, 2020

(65) Prior Publication Data

US 2020/0282328 A1 Sep. 10, 2020

Related U.S. Application Data

(62) Division of application No. 16/103,972, filed on Aug. 16, 2018.

(60) Provisional application No. 62/547,600, filed on Aug. 18, 2017.

(51) Int. Cl.
*B01D 11/02* (2006.01)

(52) U.S. Cl.
CPC ................ *B01D 11/0257* (2013.01)

(58) Field of Classification Search
CPC .. B01D 11/0257; D21H 11/12; D21H 27/002; D21H 27/30; D21H 13/10; D21H 27/02
See application file for complete search history.

(56) References Cited

U.S. PATENT DOCUMENTS

| 4,343,231 A | 8/1982 | Devreux |
| 6,158,591 A * | 12/2000 | Delp ................ B01D 11/0257 209/17 |
| 9,050,631 B2 | 6/2015 | Raichart |

FOREIGN PATENT DOCUMENTS

| CN | 104745472 A | 7/2015 |
| CN | 205340617 U | 6/2016 |

* cited by examiner

*Primary Examiner* — Waqaas Ali
(74) *Attorney, Agent, or Firm* — Dickinson Wright, PLLC; Michael E. Noe, Jr.

(57) ABSTRACT

A method and apparatus for separating trichome heads containing resin from *cannabis* plants using a double vortex liquid flow to remove the trichome heads without macerating the plant material and a multi-tiered filtration process to isolate the resin product.

8 Claims, 4 Drawing Sheets

APPARATUS AND METHOD FOR SEPARATING PLANT TRICHOMES USING A DOUBLE VORTEX TURBULENCE

CROSS-REFERENCES TO RELATED APPLICATIONS

This application is a division of U.S. patent application Ser. No. 16/103,972, filed Aug. 16, 2018, which claims priority to and the benefit of U.S. Pat. App. No. 62/547,600, filed Aug. 18, 2017. The contents of the above-referenced applications are hereby incorporated by reference in their entirety.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

1. Field of the Invention

The present invention relates generally to separating sticky particulate from plant material. More specifically, the present invention relates to separating resin heads from *cannabis* plants.

2. Description of the Related Art

Hashish is a consumable compress of purified psychoactive resin from the glandular trichomes of the *cannabis* plant. The trichomes are found on the flowers, and to a lesser extent, in the stems and leaves of the plant. Historically, separating the trichomes from the plant has been very difficult as the resin within the trichomes is quite sticky. Methods such as flat screening or dry sieving require practice and skill, are inefficient, and often result in a lower quality product that contains broken leaf-matter contaminants. Use of chemical solvents can alter the resin and produce unwanted by-products. Machines, such as that disclosed by Raichart in U.S. Pat. No. 9,050,631, which tumble the plant flowers and collect the sticky trichomes on sieving screens, although inexpensive, are also inefficient, and are difficult to clean and reuse.

Some success has been found with a process using ice, water, and a mechanical agitator. The ice reduces the stickiness of the resin in the trichome heads, and the mechanical agitator forces the trichome heads to break away from their stalks and botanical material. In addition, the use of ice and mechanical agitators on the botanical material creates plant particulate contamination in the final resin product, creating an inferior product and harsh flavors.

An example of an ice and agitator method is the cold water cleaning process and machine disclosed by Reinhard in U.S. Pat. No. 6,158,591. This machine uses an agitator similar to an electric mixer that macerates the leaves of the plant, damaging them before the resin can be removed. The machine requires the use of ice to keep the water as cold as possible, but the ice also damages the plant material, resulting in inefficiencies in the process. The machine also contains internal screens which are easily blocked by sticky resin and plant biomass, making them ineffective and preventing effective flow of liquid through the machine.

The present invention addresses these issues by combining a low temperature process with a double vortex pattern of liquid flow to gently remove the resin heads from the botanical material. The double vortex flow is created through a uniquely shaped basin in combination with a user controlled rotator plate. The double vortex flow results in a gentle, yet powerful, turbulence. The rolling effect of this turbulence gently removes the cold-water hardened trichome heads from their stalks, yielding a much cleaner and desirable end product. A subsequent filtration process is used to separate the resin containing trichome heads from the liquid. The filtration system uses a series of different sized filters to separate elements of the plant's biomass contaminants from the trichome heads. The result is a maximum separation of the resin containing trichome heads from the plant surface with negligent to non-existent contamination.

BRIEF SUMMARY OF THE INVENTION

The present invention is a method and apparatus that separates trichome heads from plants using a double vortex liquid flow to separate the trichomes from the leaves, flowers, and stems. The plant parts are placed with very cold liquid in a jacketed basin which contains a rotator plate near the bottom. The shape of the basin is circular on the front half, and a rounded square on the back half. The plant biomass is soaked in this cold liquid bath until fully hydrated, such that all plant components are completely softened and any flowers begin to open.

Following hydration, the user starts the rotator plate spinning, creating a central vortex. As the liquid swirls and picks up speed, the outer edge of the liquid flow rolls off the back side of the rounded square portion of the basin and rolls over the mid-section of the liquid flow, creating a powerful, rolling turbulence in a second vortex. After establishing this second vortex, the direction of rotation of the rotator plate is reversed, causing more gentle turbulence as the liquid flow reverses direction. When the double vortexes are created in the opposite direction, the rotator plate is again reversed to repeat the process. Each time the rotator plate direction is reversed, the velocity is increased to increase the power of the turbulence.

The liquid and separated plant biomass and trichome head resin material are evacuated from the basin through a Venturi style drain which creates a powerful flow of liquid toward the external filtration system. That powerful flow is necessary to ensure the separated plant biomass and sticky trichome head resin material do not get trapped in the drain.

The filtration system employs a series of different sized external filters to separate elements of used plant biomass, trichome head resin material, and contaminants. The first filter is designed to capture plant components that have passed through the drain and are not fully cleaned of resin. The plant components captured in this first filter may be removed and returned to the basin for further resin separation. The second filter catches the smallest botanical particles while allowing the resin components to pass through. Some resin particulate may remain with the plant material on the second filter and it may be removed and rinsed with high pressure water spray to capture more of the resin product. The final filter is designed to capture the resin product which is then removed from the filter for further processing.

BRIEF DESCRIPTION OF THE SEVERAL VIEWS OF THE DRAWINGS

A more complete understanding of the present invention may be derived by referring to the detailed description and claims when considered in connection with the figures, wherein like reference numbers refer to similar items throughout the figures and:

DETAILED DESCRIPTION OF THE INVENTION

In the following detailed description of the invention, reference is made to the accompanying drawings which form a part of the disclosure and, which show by way of illustration, and not of limitation, specific embodiments by which the invention may be practiced. The drawings, the foregoing discussion, and the following description are exemplary and explanatory only, and are not intended to limit the scope of the invention or its application in any manner.

Figure 1:
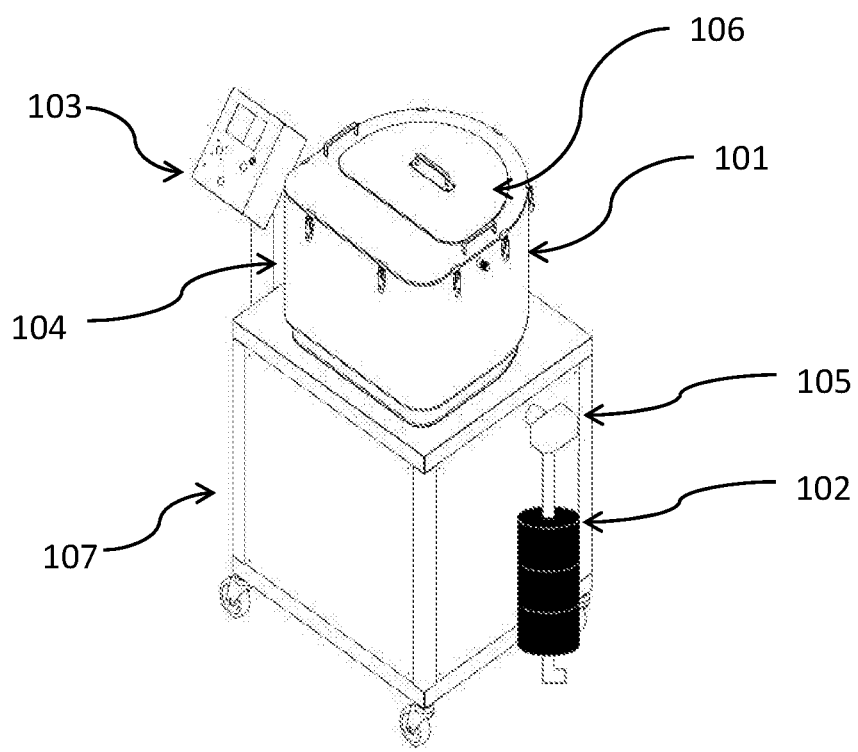
FIG. 1 is a perspective view of the exterior of the Double Vortex Machine showing the exterior of the Basin on a Cart, the Outflow Pipe and Valve, and the Multi-Tiered Filter Assembly.

The apparatus of the present invention is a Double Vortex Machine 101 and a Multi-Tiered Filter Assembly 102, used in conjunction with a liquid source. FIG. 1 shows one possible embodiment of the invention as installed conveniently on an optional Cart 107. The liquid is preferably water, and the source may be a food-grade water hose with a high pressure spray nozzle attached. In another embodiment, the Double Vortex Machine 101 may also be hard plumbed to a water or other liquid source. The Double Vortex Machine 101 has a uniquely shaped Basin 104, a Rotator Plate 201, a Motor 302, a Control Unit 103, a Venturi Drain 202, and an Outflow Pipe Assembly 105. The Multi-Tiered Filter Assembly 102 is attached to the Outflow Pipe Assembly 105 and includes a series of removable Filters 305, 306, and 307. The attributes of each element of the assembly are described throughout the following description of the extraction process.

Figure 2:
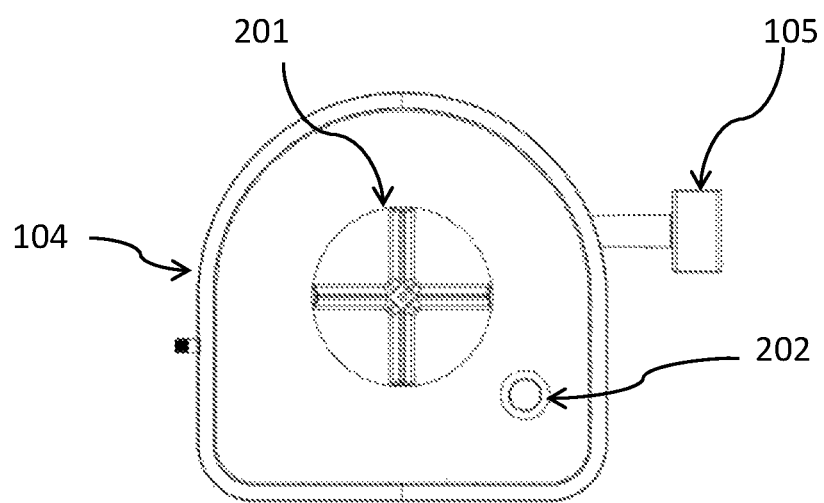
FIG. 2 is a view of the top of the Double Vortex Machine without a Cover or a Cart and showing the interior shape, the Rotator Plate and the location of the Venturi drain.
Figure 3:
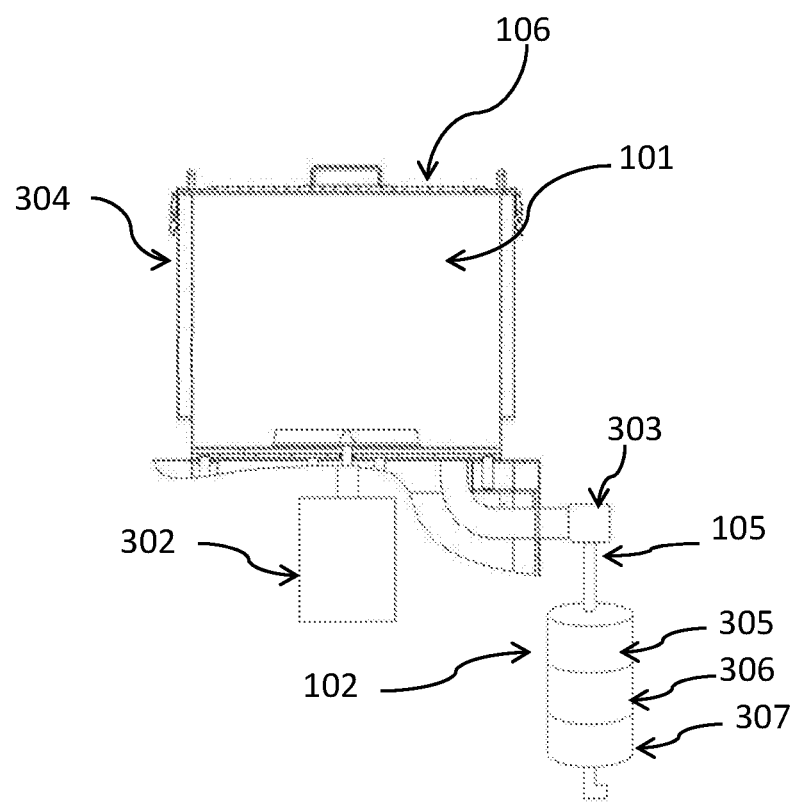
FIG. 3 is a cross section of the Double Vortex Machine showing the Jacketing, a possible shape of the Rotator Plate, the location of the Motor and the Multi-Tiered Filter Assembly showing three Filters.

The process begins with hydration of the plant product in the Basin 104 of the Double Vortex Machine 101. As shown in FIG. 2, the Basin 104 is shaped such that the front half is a semi-circle and the back half is a rounded square. The distance from the center of the semi-circle to the flat portion of the rounded square is preferably equal to, or just slightly larger, than the radius of the semi-circle. The Basin 104 is preferably made of stainless steel to prevent the resin from sticking to the surface and to facilitate cleaning, but it may be made of any other suitable material. The Basin 104 is also preferably jacketed as shown in FIG. 3, and may have a Cover 106 as shown in FIGS. 1 and 3, to help maintain the liquid temperature at close to freezing.

A Venturi Drain 202, located in the bottom of the Basin 104, is connected to the Outflow Pipe Assembly 105 which includes a Valve 303. The Valve 303 is preferably manually operated, but may also be electrically connected to, and controlled by, the Control Unit 103. With the Valve 303 in the closed position, the Basin 104 is filled approximately two thirds full with very cold liquid, preferably water. If a cold liquid source is not available, the temperature of the liquid may be reduced to near zero degrees Celsius via the introduction of coolant to the Jacketed Portion 304 of the Basin 104, if the Basin 104 is jacketed. The plant product is placed in the Basin 104 with the very cold liquid and is soaked in this bath until all elements are fully hydrated and any flowers begin to open.

The Rotator Plate 201, located at the geometric center of the Basin 104, is positioned slightly above the bottom of the Basin 104 such that there is sufficient clearance beneath the Rotator Plate 201 to ensure plant material does not become trapped underneath. The shape of the Rotator Plate 201 is preferably fairly flat with several ribs of sufficient height to move the liquid into a First Vortex 401 when it is rotated, as shown by the arrows in FIG. 4. The Rotator Plate 201 is preferably made of stainless steel, but may be made of any suitable material. The Rotator Plate 201 is connected mechanically to a Motor 302 which is connected electrically to the Control Unit 103. The Motor 302 has variable speed capability, preferably from 300 to 1700 rpm, which may be adjusted by the user through the Control Unit 103. The Control Unit 103 is preferably designed to automatically reverse the Motor 302 direction at intervals based on the adjusted speed, but this reversal may also be done manually by the user. The Motor 302 and Control Unit 103 components are all readily available catalogue items, and no particular model(s) or specifications are indicated.

Figure 4:
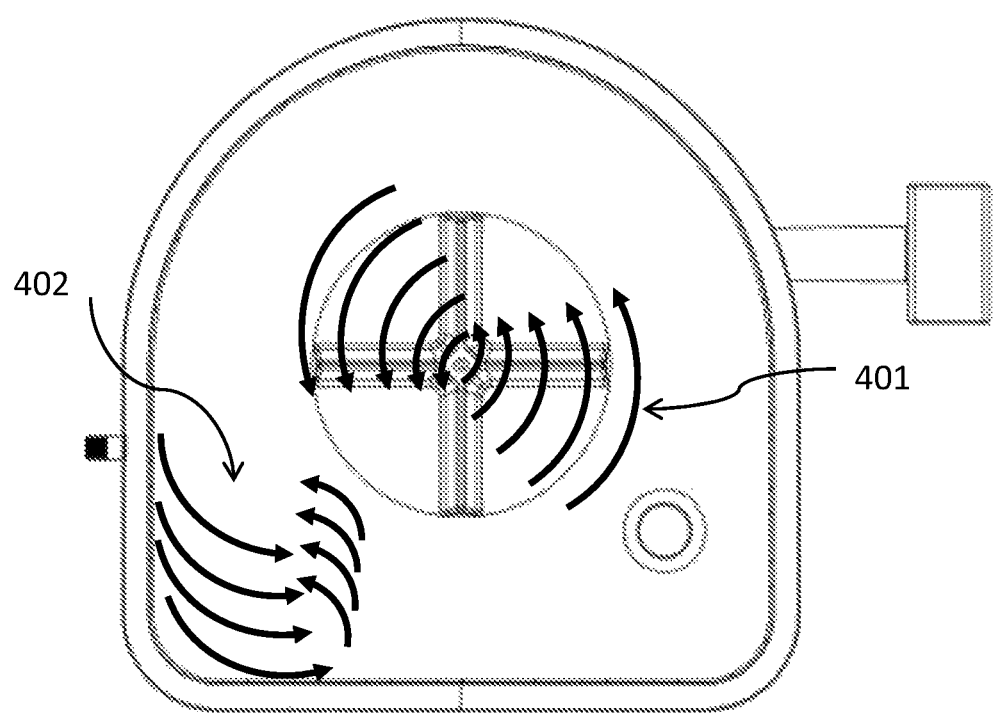
FIG. 4 is a schematic showing the liquid flows in the First and Second vortexes when the Rotator Plate is spinning in the clockwise direction.

After hydration of the plant product is complete, the user starts the Rotator Plate 201 spinning using the Control Unit 103. The spinning of the Rotator Plate creates a First Vortex 401 in the Basin 104. As the liquid swirls and picks up speed, the outer edge of the liquid flow rolls off the back side of the rounded square portion of the Basin 104 and rolls over the mid-section of the liquid flow, creating a Second Vortex 402 as shown in FIG. 4. After establishing this Second Vortex 402, the direction of rotation of the Rotator Plate 201 is reversed, either automatically through design of the Control Unit 103, or manually by the user. The reversal action creates more turbulence as the liquid flow reverses direction. Ultimately, double vortexes are created in the opposite direction, and the user, or the Control Unit 103, reverses the Rotator Plate 201 direction again to repeat the process.

Each time the Rotator Plate 201 direction is reversed, the velocity is preferably increased to increase the power of the turbulence. The increase in velocity is preferably manually adjusted by the user, but it may also be automated in the Control Unit 103.

After a sufficient amount of trichome heads containing resin have been separated from the plant material, the Rotator Plate 201 rotation is stopped and the filtering portion of the process is started. The Valve 303 in the Outflow Pipe Assembly 105 is opened and the liquid, processed plant biomass and separated trichome heads containing the resin flow through the Venturi Drain 202 to the Multi-Tiered Filter Assembly 102. The Valve 303 is preferably manually operated, but may also be an electronically controlled and operated valve, such as a solenoid. If an electronically controlled valve is used, it would preferably be electrically connected to, and operated by, the Control Unit 103.

The Multi-Tiered Filter Assembly 102 contains at least two, and preferably three, removable Filters 305, 306, and 307. The First Filter 305, preferably with a mesh size of approximately 190 microns, is sized to capture plant components that have passed through the drain and are not fully cleaned of resin. The plant components captured in this First Filter 305 may be removed and returned to the basin for further resin separation. The Multi-Tiered Filter Assembly 102 preferable contains a Middle Filter 306 with a mesh size of approximately 160 microns that will capture both trichome heads containing resin material and plant biomass of a similar size. Some resin particulate may remain with the plant material on the Middle Filter 306, and it may be removed and rinsed with high pressure water spray to capture more of the resin product. The Final Filter 307, preferably with a mesh size of approximately 45 microns, captures the resin product. The Final Filter 307 is removed and the resin is cleaned from it to be prepared for further processing.

Many modifications and variations of this invention may be made without departing from its spirit and scope, as will be appreciated by those skilled in the art. For example, the Multi-Tiered Filter Assembly 102 could contain several additional intermediate filters to facilitate the filtering process. The cleaning of the filters could also be automated by including space and controls for high pressure liquid sprays between each of the filters. Also, although water is specified herein as preferable, any suitable liquid could be used as the medium for the plant material. The specific embodiments described herein are offered by way of example only. The embodiments were chosen and described in order to best explain the principles of the invention and its practiced applications.

What is claimed is:

1. A method of separating resin from plant biomass, the method comprising:
   (a) providing a basin having a semi-cylindrical front portion and a rounded box back portion comprising two rounded corners extending in a vertical direction;
   (b) placing liquid and plant material inside the basin to form a mixture;
   (c) rotating the mixture inside the basin in one rotational direction until a first double agitation is formed simultaneously in the liquid, the first double agitation comprising a vortex of the mixture about a vertical axis of rotation of the vortex, and a second agitation of the mixture adjacent to a first one of the two rounded corners of the basin;
   (d) reversing the rotational direction of the mixture until a second double agitation is formed simultaneously in opposite direction, the second double agitation comprising another vortex of the mixture about the vertical axis of rotation, and another agitation of the mixture adjacent to a second one of the two rounded corners of the basin;
   (e) repeating steps (c) and (d) at increasing speeds of rotation and separating resin from trichome heads of the plant material; and then
   (f) draining the mixture from the basin to form a drained mixture.

2. The method of claim 1 wherein, after step (f), further comprising filtering the drained mixture to remove the resin and trichome heads from the liquid and plant material.

3. The method of claim 1, further comprising automating steps (c) and (d), and repeating step (e) at selected intervals.

4. The method of claim 1, wherein steps (c) and (d) comprise agitating the mixture with a flat rotator plate having rounded ribs extending in a radial direction relative to the vertical axis of rotation.

5. The method of claim 1 wherein, after step (d), further comprising:
   ; and
   filtering the draining liquid to remove the resin and trichome heads from the liquid and plant material; and
   removing one or more series filters with the filtered resin and trichome heads.

6. A method of separating resin from plant biomass, the method comprising:
   (a) providing a basin having a semi-cylindrical front portion and a rounded box back portion comprising two rounded corners extending in a vertical direction;
   (b) placing liquid and plant material inside the basin to form a mixture;
   (c) rotating the mixture inside the basin in one rotational direction until a first double agitation is formed simultaneously in the liquid, the first double agitation comprising a vortex of the mixture about a vertical axis of rotation of the vortex, and a second agitation of the mixture adjacent to a first one of the two rounded corners of the basin;
   (d) reversing the rotational direction of the mixture until a second double agitation is formed simultaneously in opposite direction, the second double agitation comprising another vortex of the mixture about the vertical axis of rotation, and another agitation of the mixture adjacent to a second one of the two rounded corners of the basin;
   (e) repeating steps (c) and (d) at increasing speeds of rotation and separating resin from trichome heads of the plant material;
   (f) draining the mixture from the basin to form a drained mixture; and
   (g) filtering the drained mixture to remove the resin and trichome heads from the liquid and plant material.

7. The method of claim 6, further comprising automating steps (c) and (d), and repeating step (e) at selected intervals.

8. The method of claim 6 wherein, after step (d), further comprising removing one or more series filters with the filtered resin and trichome heads.

* * * * *